No. 687,515. Patented Nov. 26, 1901.
R. E. BOSCHERT.
APPARATUS FOR TREATING GARBAGE.
(Application filed Mar. 26, 1901.)
(No Model.) 7 Sheets—Sheet 1.

WITNESSES:
H. B. Smith.
Wm Hawley

INVENTOR
Rufus E. Boschert
By E. Laass
ATTORNEY.

No. 687,515. Patented Nov. 26, 1901.
R. E. BOSCHERT.
APPARATUS FOR TREATING GARBAGE.
(Application filed Mar. 26, 1901.)
(No Model.) 7 Sheets—Sheet 2.

WITNESSES:

INVENTOR
Rufus E. Boschert
By E. Laass
ATTORNEY.

No. 687,515. Patented Nov. 26, 1901.
R. E. BOSCHERT.
APPARATUS FOR TREATING GARBAGE.
(Application filed Mar. 26, 1901.)
(No Model.) 7 Sheets—Sheet 3.

WITNESSES:
INVENTOR
Rufus E. Boschert
By E. Laass
ATTORNEY.

No. 687,515. Patented Nov. 26, 1901.
R. E. BOSCHERT.
APPARATUS FOR TREATING GARBAGE.
(Application filed Mar. 26, 1901.)

(No Model.) 7 Sheets—Sheet 5.

WITNESSES: INVENTOR
Rufus E. Boschert
By E. Laas
ATTORNEY.

No. 687,515. Patented Nov. 26, 1901.
R. E. BOSCHERT.
APPARATUS FOR TREATING GARBAGE.
(Application filed Mar. 26, 1901.)
(No Model.) 7 Sheets—Sheet 6.

WITNESSES:
INVENTOR
Rufus E. Boschert
ATTORNEY.

No. 687,515. Patented Nov. 26, 1901.
R. E. BOSCHERT.
APPARATUS FOR TREATING GARBAGE.
(Application filed Mar. 26, 1901.)

(No Model.) 7 Sheets—Sheet 7.

WITNESSES:
H. B. Smith.
Wm. Hawley.

INVENTOR
Rufus E. Boschert
By E. Laas
ATTORNEY.

UNITED STATES PATENT OFFICE.

RUFUS E. BOSCHERT, OF SYRACUSE, NEW YORK.

APPARATUS FOR TREATING GARBAGE.

SPECIFICATION forming part of Letters Patent No. 687,515, dated November 26, 1901.

Application filed March 26, 1901. Serial No. 52,962. (No model.)

*To all whom it may concern:*

Be it known that I, RUFUS E. BOSCHERT, a citizen of the United States, and a resident of Syracuse, in the county of Onondaga, in the State of New York, have invented new and useful Improvements in Apparatus for Treating Garbage, of which the following, taken in connection with the accompanying drawings, is a full, clear, and exact description.
This invention consists in an improved construction and combination of the component parts of an apparatus which possesses superior efficiency in its operation of separating the oils and liquids from solid matter in garbage, and embodies novel features of its details, which render the apparatus strong and durable.

Figure 1:
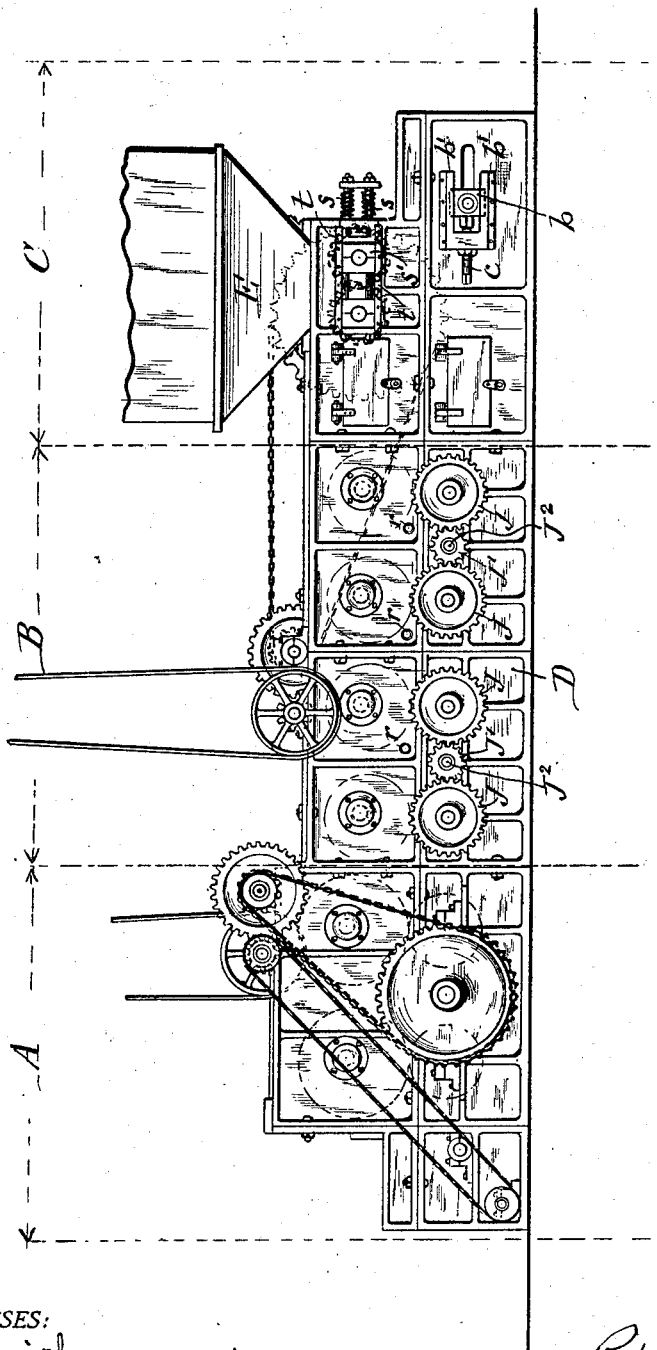
Figure 2:
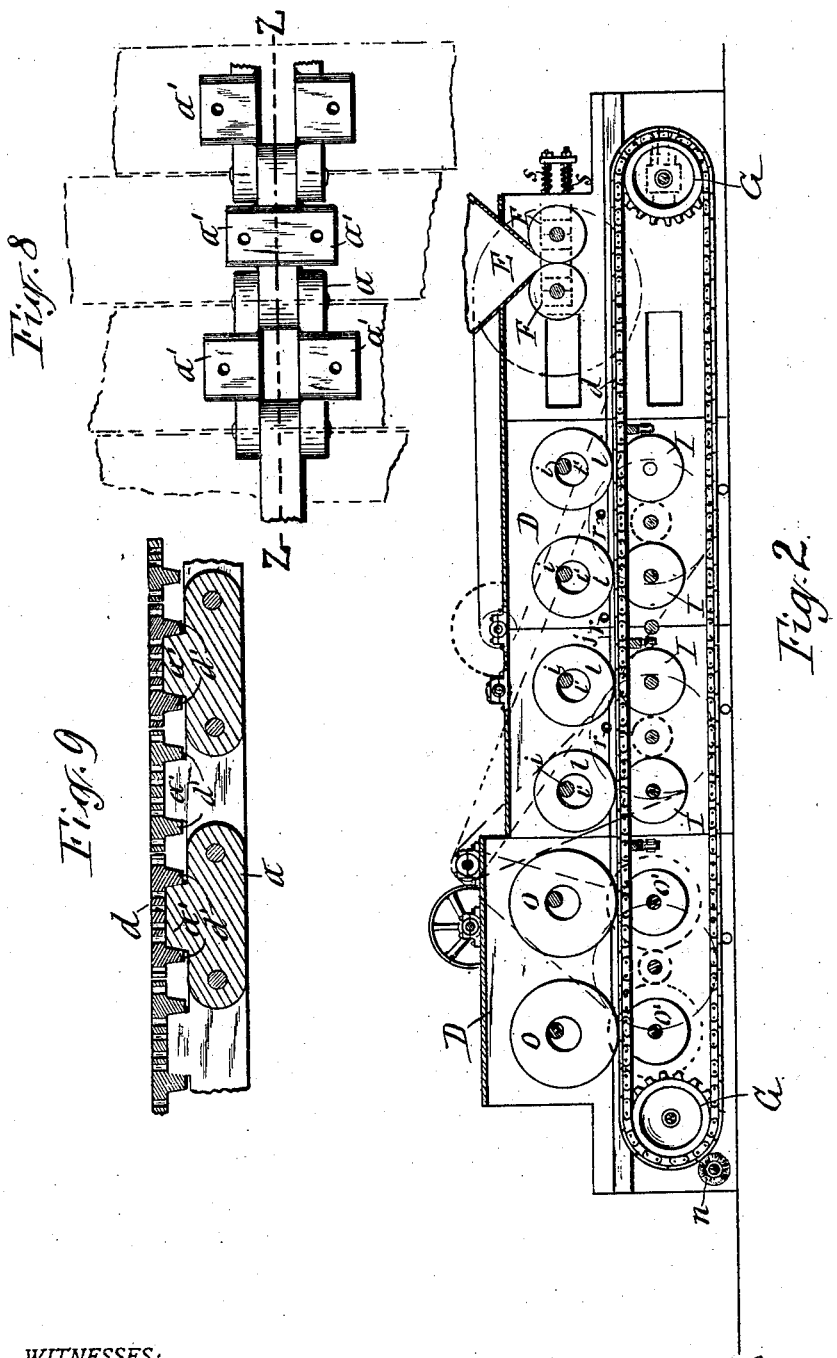
Figure 3:
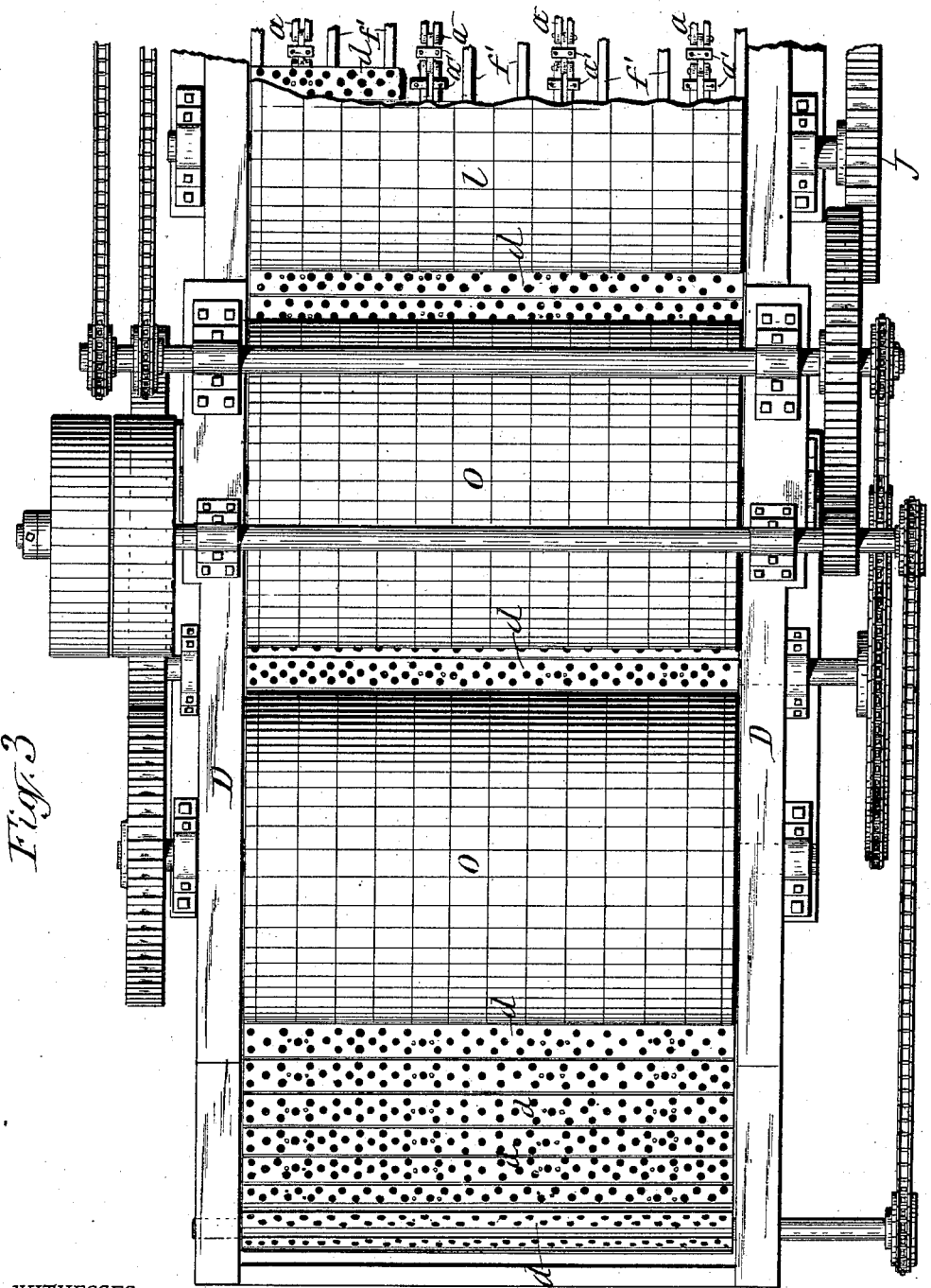
Figure 4:
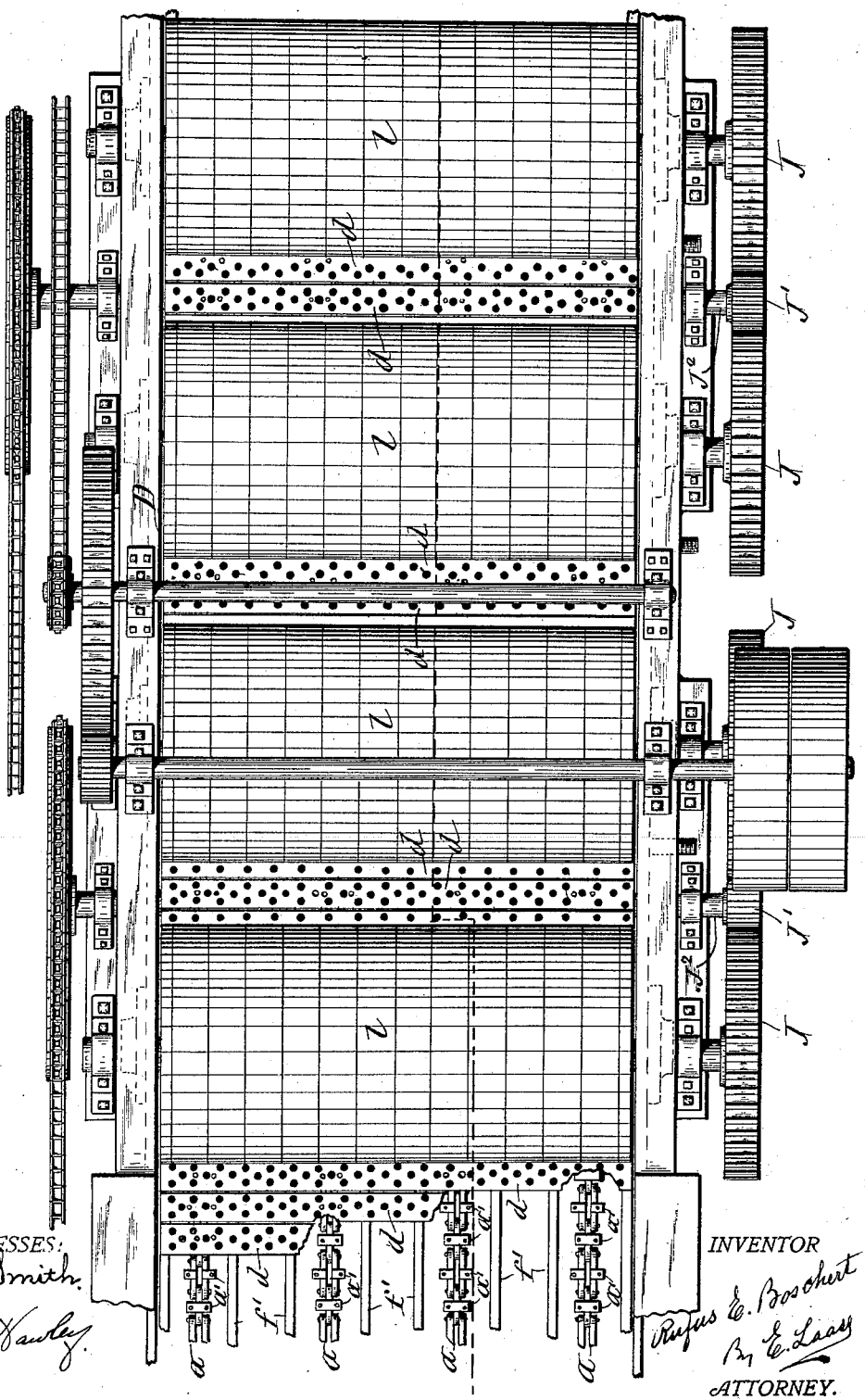
Figure 5:
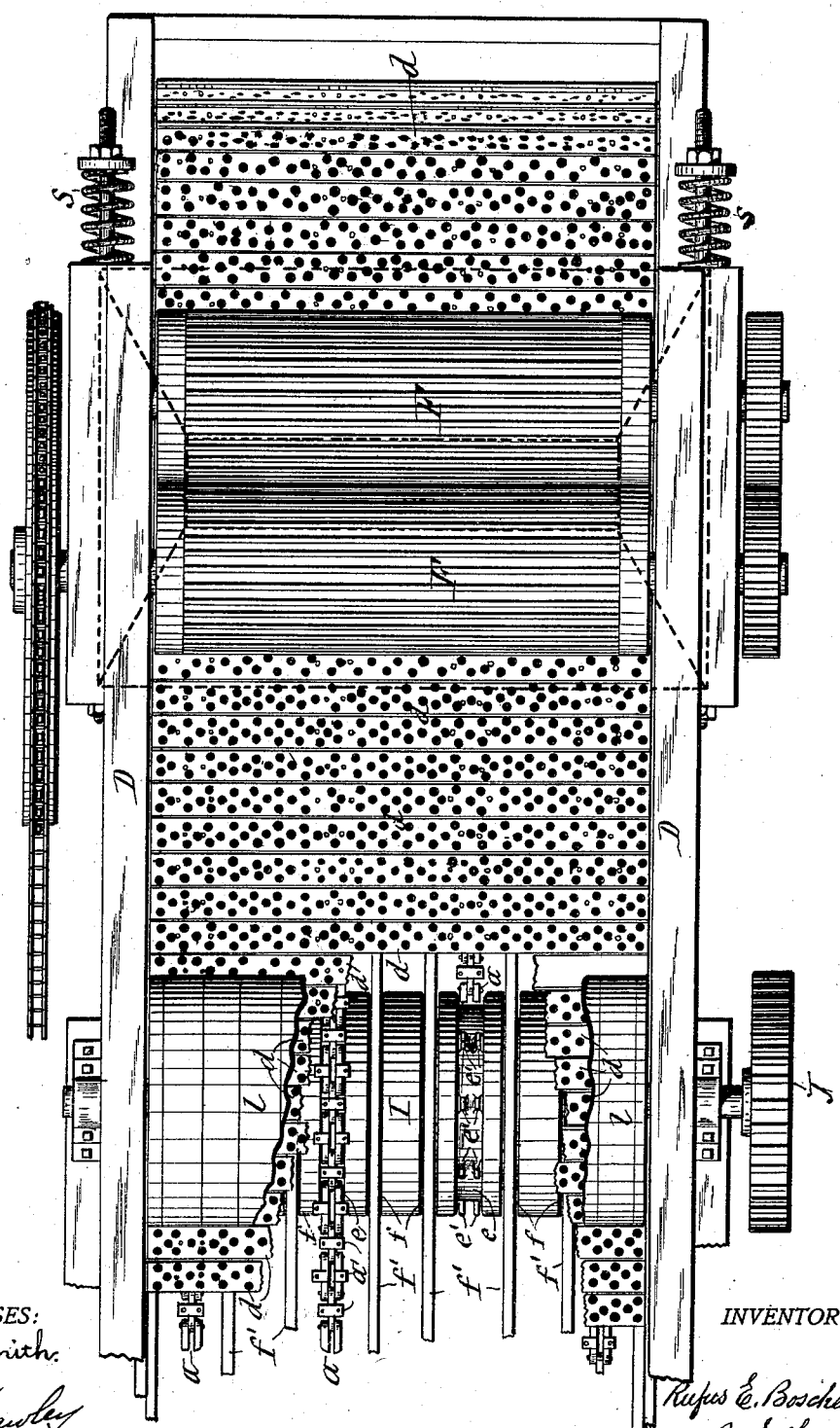
Figure 6:
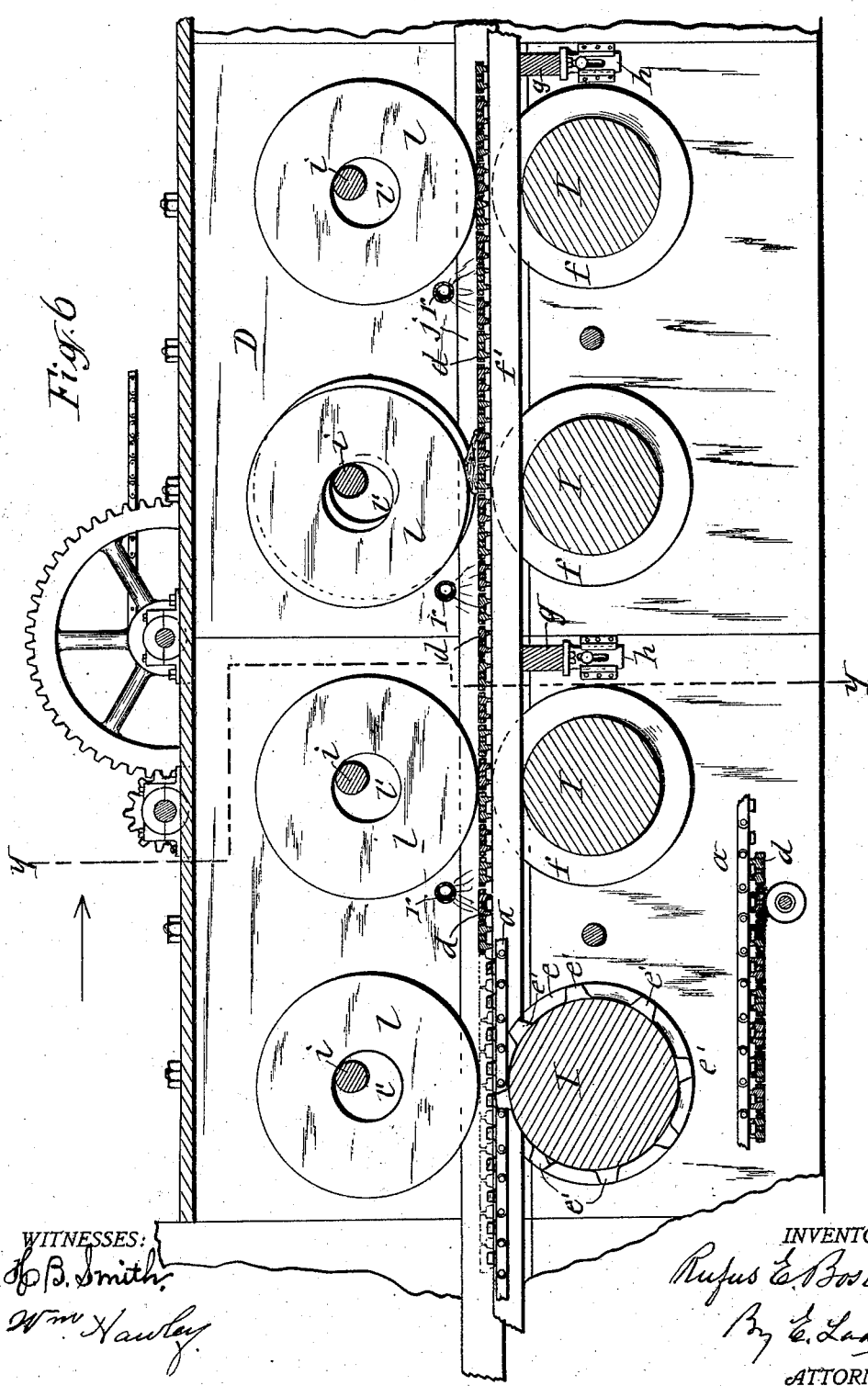
Figure 7:
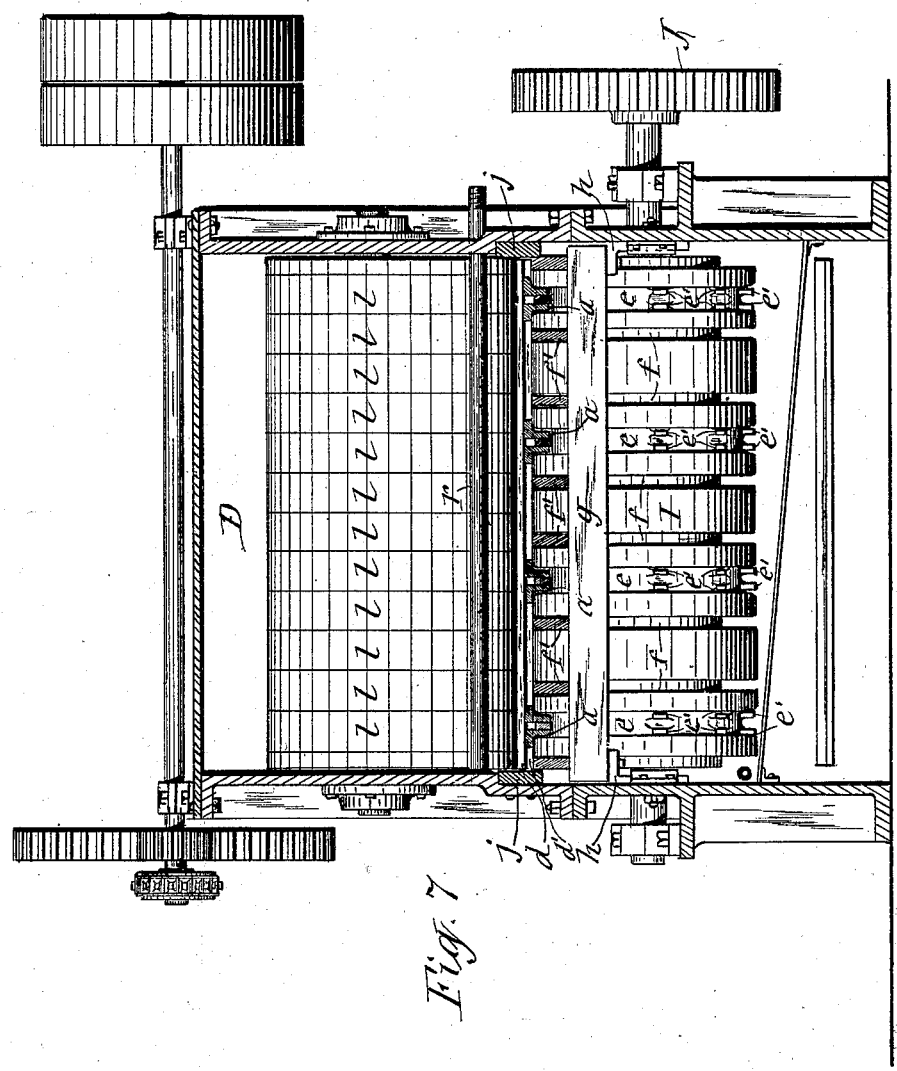

The invention is fully illustrated in the annexed drawings, in which—
Figure 1 is a side elevation of an apparatus embodying my improvements. Fig. 2 is a vertical longitudinal section of the same. Figs. 3, 4, and 5 are enlarged top plan views of the three portions of the apparatus indicated at A, B, and C in Fig. 1. Fig. 6 is a vertical longitudinal section on line X X in Fig. 4. Fig. 7 is a vertical transverse section on line Y Y in Fig. 6. Fig. 8 is an enlarged plan view of a section of one of the conveyer-chains, and Fig. 9 is a longitudinal section of said portion of the chain with the draining-slats mounted thereon.

Similar letters of reference indicate corresponding parts.
D represents the chamber which incloses the necessary devices for treating the garbage. Said chamber is preferably formed of metal and sufficiently tight to prevent escape of gases and odor therefrom. One end of this chamber is provided with the supply-hopper E, which receives the garbage from the usual digester, (not shown,) in which the garbage is cooked preparatory to its treatment within the chamber D. Directly under the hopper E is a pair of feeding-rollers F F, disposed to receive between them the garbage delivered from the hopper. One of said feeding-rollers is sustained yieldingly to allow hard substances to pass between the rollers, said yielding support consisting of springs $s$, bearing on the sides of the journal-boxes $s'$ of the roller, which journal-boxes ride in longitudinal guides $t$ on the sides of the chamber. Beneath these feed-rollers is an endless conveyer consisting of draining-slats $d$, attached transversely to sprocket-chains $a\ a$, carried on sprocket-wheels G G, disposed in the end portions of the chamber D. One of these sprocket-wheels has its shaft journaled in boxes $b$, which are supported on longitudinal guides $b'$, formed on yokes secured to the sides of the chamber. By means of screws $c$, passing horizontally through correspondingly-screw-threaded holes in the yokes and bearing on the sides of the boxes facing toward the farther end of the chamber, said boxes can be shifted to cause the sprocket-wheel G to maintain the chains $a\ a$ at the proper tension.

The sprocket-chain $a$ is composed of links which are formed with transverse plates $a'$, upon which the slats $d$ ride, and are fastened by rivets passing through said slats and plates, as shown more clearly in Figs. 8 and 9 of the drawings. The slats are perforated for draining the garbage carried thereon and are formed of iron or steel and with reinforcing side flanges $d'$, which extend the entire length of the slats to thoroughly brace the same and bear on the transverse edges of the plates $a'$ of the chains $a$ to obtain a firm hold thereon, and thereby relieve the attaching-rivets from shearing strain. This firm hold is especially essential in this case, as the perforations in the slats obtain a hold on the solid matter of the garbage under pressure, so as to prevent it from slipping on the slats while subjected to the wedging action of the compressing-rollers pressing upon the garbage passing under them. In consequence of said resistance exerted on the slats it is essential to provide the perfectly secure hold of the slat on the chains, which hold is obtained by the flanges $d'$ of the slats engaging the plates $a'$ of the chains.

I I I I represent intermediate carrying-rollers supporting the slats $d$ of the conveyer at intervals in the length of the chamber D. These carrying-rollers are preferably arranged in pairs and are caused to rotate synchronously and in the same direction by means of gear-wheels J J, of corresponding diameters, fastened to the shafts of said rollers, each pair of which wheels mesh with an intermediate pinion J', attached to a driven shaft J².

The rollers I are formed with circumferential sunken passages e for the chains a, and in said passages are sprocket-teeth e', engaging the chains and imparting thereto the longitudinal movement required to propel the endless conveyer which carries the garbage. The passages e are of sufficient depth to allow the flanges d' of the draining-slats d to ride on the periphery of the rollers I, and thus support the slats of the conveyer with the compressing-rollers bearing thereon. In this respect the flanges of the slats perform the additional important function of supporting the slats without bringing the bottoms thereof in contact with the carrying-rollers, thus allowing drainage through the slats during their transit over said rollers and while subjected to the pressure of the superposed compressing-rollers. The carrying-rollers are also provided with circumferential grooves f, through which pass longitudinal bars f', which are supported upon transverse bars g, mounted at their ends on brackets h, secured to the sides of the chamber D in a suitable manner to allow said transverse bars to be adjusted to maintain the tops of the longitudinal bars f' in a proper plane to support the slats d of the conveyers at the intervals between the carrying-rollers I. Over each of said rollers is a stationary transverse shaft i, on which are mounted a series of compressing-rollers l l, provided with enlarged axial bearings l' to allow said compressing-rollers to operate by gravity and yield vertically independent of each other, and thus obviate lifting of the entire series of said rollers from the conveyer in case an article of iron or steel or other equally hard substance passes under one or a portion of the series of rollers. Said independent action of the individual compressing-roller of each series is very important in that it obviates the liability of leaving wet streaks across the layer of garbage on the conveyer.

j j denote guard-rails composed of steel or iron and fastened to the inner sides of the chamber in a position to extend along the edges of the conveyer and to project above and below the same, so as to protect the sides of the chamber from wear and abrasion by the traveling conveyer.

Over the conveyer in the spaces between the successive compressing-rollers I employ suitable rinsers r to apply water to the substances carried on the conveyer, and thus saturate said substances in advance of the squeezing it is subjected to in passing under the succeeding compressing-rollers. This alternate saturation and compression causes a more effectual separation of the oily or liquid ingredients from the solid matter of the garbage under treatment. I preferably form the aforesaid rinsers of pipes communicating with a suitable source of water and extending across the chamber at a suitable distance above the conveyer. The bottom portions of said pipes are perforated to throw a spray of water on the garbage. Beyond the aforesaid compressing-rollers are final compressing-rollers O O, which are also mounted in series on stationary shafts in such a manner as to allow the rollers of each series to yield vertically independent of each other. Directly under each series of these final compressing-rollers is a carrying-roller O', formed substantially like the carrying-rollers I and geared to rotate in substantially the same manner. These final compressing-rollers O, with the subjacent carrying-rollers O', are designed to complete the process of separating the oily or liquid ingredients from the solid matter of the garbage, and I therefore omit the rinsers over the conveyer beyond the compressing-roller l nearest the final compressing-roller O.

n denotes a brush or scraper employed for cleaning the top of the conveyer after leaving the final compressing-roller O.

The means for transmitting motion to the feeding-rollers F F, conveyer-chains a, and carrying-rollers I and O' are susceptible of many modifications and will suggest themselves to any mechanic skilled in the art to which this invention pertains.

What I claim as my invention is—

1. An apparatus for treating garbage, comprising a traveling endless conveyer carrying the garbage, rotary carrying-rollers under said conveyer, stationary shafts disposed over said rollers and parallel therewith, a plurality of separate compressing-rollers mounted on each of said shafts, and each of said compressing-rollers provided with an enlarged axial bearing to allow it to ride by gravity on the subjacent carrying-roller and to yield vertically independent of the rollers on the same shaft as set forth.

2. In combination with the horizontally-elongated chamber provided with the supply-hopper at one end and feeding-rollers under said hopper, sprocket-wheels disposed in the end portions of the chamber, chains carried on said sprocket-wheels, mechanism imparting motion to the sprocket-wheels, draining-slats fastened transversely to said chains, intermediate carrying-rollers provided with circumferential grooves, longitudinal bars passing through said grooves and supporting the aforesaid slats, and compressing-rollers disposed over the said carrying-rollers as set forth.

3. In combination with the horizontally-elongated chamber provided with the supply-hopper at one end and feeding-rollers under said hopper, sprocket-wheels disposed in the end portions of the chamber, chains carried on said sprocket-wheels, mechanism imparting motion to said sprocket-wheels, draining-slats secured to said chains, intermediate carrying-rollers supporting the slats, longitudinal bars supporting the slats between said carrying-rollers, transverse bars sustained vertically adjustable and supporting the aforesaid longitudinal bars, compressing-rollers disposed parallel over the aforesaid carrying-rollers as set forth.

4. In combination with the horizontally-elongated chamber provided with the supply-hopper at one end and feeding-rollers under said hopper, two sets of sprocket-wheels disposed respectively in opposite end portions of the chamber and distributed across the same, chains carried on said sprocket-wheels, draining-slats secured to said chains, intermediate carrying-rollers provided with circumferential passages for the chains, and with circumferential grooves, longitudinal bars passing through said grooves and supporting the aforesaid slats, transverse bars supporting the longitudinal bars, brackets adjustably secured to the sides of the chamber and supporting the transverse bars, and compressing-rollers directly over the carrying-rollers as set forth.

5. In combination with the horizontally-elongated chamber provided with the supply-hopper at one end and feeding-rollers under said hopper, two sets of sprocket-wheels disposed respectively in opposite end portions of the chamber and distributed across the same, chains carried on said wheels, draining-slats secured to said chains, intermediate carrying-rollers provided with circumferential passages for the chains and with circumferential grooves, longitudinal bars passing through said grooves and supporting the aforesaid slats, transverse bars supporting the longitudinal bars, brackets adjustably secured to the sides of the chamber and supporting the transverse bars, stationary shafts disposed parallel over the intermediate carrying-rollers, and a plurality of compressing-rollers on each of said stationary shafts and provided with enlarged axial bearings to permit said compressing-rollers to yield vertically independent of each other as set forth.

6. The carrying-roller formed with circumferential sunken passages, in combination with superposed compressing-rollers, conveyer-chains extending through said passages, and perforated draining-slats mounted on said chains and provided with flanges supporting the draining-slats on the carrying-roller with draining-spaces under the slats directly over said roller as set forth.

RUFUS E. BOSCHERT. [L. S.]

Witnesses:
J. J. LAASS,
H. B. SMITH.